(12) United States Patent
Datta et al.

(10) Patent No.: US 10,943,042 B1
(45) Date of Patent: Mar. 9, 2021

(54) DATA FLOW GRAPH OPTIMIZATION TECHNIQUES FOR RTL LOOPS WITH CONDITIONAL-EXIT STATEMENTS

(71) Applicant: Xilinx, Inc., San Jose, CA (US)

(72) Inventors: Sumanta Datta, Hyderabad (IN); Aman Gayasen, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/733,568

(22) Filed: Jan. 3, 2020

(51) Int. Cl.
*G06F 30/337* (2020.01)
*H03K 19/17748* (2020.01)
*G06F 119/12* (2020.01)

(52) U.S. Cl.
CPC ..... *G06F 30/337* (2020.01); *H03K 19/17748* (2013.01); *G06F 2119/12* (2020.01)

(58) Field of Classification Search
CPC ...... G06F 30/30; G06F 30/323; G06F 30/327; G06F 30/3323; G06F 30/337; G06F 2119/12
USPC .................................. 716/103, 107, 134, 100
See application file for complete search history.

(56) References Cited

U.S. PATENT DOCUMENTS

2007/0226666 A1*  9/2007  Ganai ................. G06F 30/3323
                                                        716/103
2008/0301602 A1* 12/2008  Koelbl ................ G06F 30/3323
                                                        716/107

* cited by examiner

*Primary Examiner* — Paul Dinh
(74) *Attorney, Agent, or Firm* — Amir Tabarrok, Rimon Law Firm Evolved (57) ABSTRACT

A computer-implemented method includes compiling a Register Transfer Level (RTL) code to form a data flow graph (DFG). The computer-implemented method includes identifying a chain of multiplexers in the DFG, wherein the chain of multiplexers includes exit multiplexers associated with a loop exit path and non-exit multiplexers. The computer-implemented method also includes traversing a topological order of the DFG in reverse. The computer-implemented method also includes computing fanin-cones for each two consecutive exit multiplexers. The computer-implemented method includes generating a truth table responsive to valid fanin-cones and back propagating select conditions for the each two consecutive exit multiplexers. The computer-implemented method includes eliminating an exit multiplexer from the each two consecutive exit multiplexers based on the truth table. The computer-implemented method further includes transforming the DFG to a new DFG based on the truth table.

20 Claims, 7 Drawing Sheets

DATA FLOW GRAPH OPTIMIZATION TECHNIQUES FOR RTL LOOPS WITH CONDITIONAL-EXIT STATEMENTS

TECHNICAL FIELD

The disclosure generally relates to the field of integrated circuits (ICs) and more particularly to a method for optimizing Data Flow Graph (DFG).

BACKGROUND

In digital circuit design, Register Transfer Level (RTL) is a design abstraction which models a synchronous digital circuit in terms of the flow of digital signals (data) between hardware components, e.g., registers, the logical operations performed on digital signals, etc. RTL abstraction is used in hardware description languages (HDLs) like Verilog (VHDL) to create high-level representations of a circuit, from which lower-level representations and ultimately actual wiring can be derived. Logic Synthesis tools parse the user design written in RTL and convert it into an intermediate graph-based representation called Data Flow Graph (DFG). During this process if any RTL loop is present in the user design, it is unrolled in the DFG. Additionally, if the loop body contains conditional-exit statements then unrolling creates a chain of exit-multiplexers (MUXes) in the DFG. A DFG with a chain of exit-multiplexers results in inefficiencies and often poor Quality of Results (QoR). Traditionally, a chain of exit multiplexers is not optimized in DFG, and it only depends on the downstream Boolean optimization to minimize the logic.

SUMMARY

Accordingly, there is a need to optimize a chain of exit multiplexers in DFG. It is desirable to optimize the DFG to achieve a better Quality of Results (QoR), by reducing the number of unnecessary multiplexers and to reduce the amount of time needed to receive the needed output signal.

One or more embodiments are directed to methods for optimizing DFG for RTL loops with conditional-exit statements. In some embodiments, a computer-implemented method includes compiling a Register Transfer Level (RTL) code to form a data flow graph (DFG). The computer-implemented method can include identifying a chain of multiplexers in the DFG, wherein the chain of multiplexers includes exit multiplexers associated with a loop exit path and non-exit multiplexers. The computer-implemented method is appreciated to be traversing a topological order of the DFG in reverse. The computer-implemented method may include computing fanin-cones for each two consecutive exit multiplexers. The computer-implemented method can include generating a truth table responsive to valid fanin-cones, and back propagating select conditions for the each two consecutive exit multiplexers. The computer-implemented method includes eliminating an exit multiplexer from the each two consecutive exit multiplexers based on the truth table.

In some embodiments, at least one non-exit multiplexer is positioned in between each two consecutive exit multiplexers. In some embodiments, an exit multiplexer is configured to receive all its input signals from outputs of other multiplexers in the DFG. In some embodiments, an exit multiplexer is configured to receive at least one input signal from a multiplexer other than its immediately preceding multiplexer in the DFG. In some embodiments, a non-exit multiplexer is configured to receive an input signal from a source other than an output of a multiplexer within the chain of multiplexers in the DFG. In some further embodiments, the non-exit multiplexer is configured to receive another input signal from an output of another multiplexer within the chain of the multiplexers in the DFG.

In some embodiments, a fanin-cone of an exit multiplexer is valid when input signals for the exit multiplexer is an output from preceding multiplexer within the chain in the DFG. In some embodiments, the computer-implemented method further comprises repeating the traversing and the computing for a remainder of the chain of multiplexers in the DFG responsive to an invalid fanin-cone for an exit multiplexer of the each two consecutive multiplexers.

In some embodiments, the each two consecutive exit multiplexers comprise a first exit multiplexer and a second exit multiplexer wherein the second exit multiplexer receives at least one input signal from the first exit multiplexer of the DFG. In some further embodiments, select signals of the first and the second exit multiplexers are back propagated through the fanin-cone of the second exit multiplexer. In some further embodiments, select signals of the first and the second exit multiplexers are back propagated through the fanin-cone of the first exit multiplexer. In some further embodiments, select signals of the first and the second exit multiplexers are back propagated through the first exit multiplexer. In some further embodiments, the eliminated exit multiplexer is the second exit multiplexer.

In some embodiments, the method further comprises transforming the DFG to a new DFG after the elimination. In some further embodiments, a data flow of the new DFG is in opposite direction to that of the DFG. In some further embodiments, the chain of multiplexers includes a first non-exit multiplexer, at least one exit multiplexer, and a second non-exit multiplexer positioned in the topological order in the DFG, and wherein a data flow ordering of the first and the second non-exit multiplexers is reversed and the second non-exit multiplexer, the first non-exit multiplexer, and the at least one exit multiplexer are positioned in the topological order in the new DFG.

In some embodiments, a computer-implemented method includes receiving a data flow graph (DFG) generated from compilation of a Register Transfer Level (RTL) code. The computer-implemented method can include identifying a chain of multiplexers in the DFG, wherein the chain of multiplexers includes exit multiplexers associated with a loop exit path and non-exit multiplexers. The computer-implemented method is appreciated to be traversing a topological order of the DFG in reverse. The computer-implemented method may include computing fanin-cones for each two consecutive exit multiplexers. The computer-implemented method can include generating a truth table responsive to valid fanin-cones, and back propagating select conditions for the each two consecutive exit multiplexers. The computer-implemented method further includes transforming the DFG to a new DFG based on the truth table, wherein a data flow of the new DFG that include the chain of multiplexers is in reverse order in comparison to the DFG and wherein the chain of exit multiplexers are eliminated in the new DFG.

In some embodiments, an exit multiplexer is configured to receive all its input signals from outputs of other multiplexers in the DFG, and wherein a non-exit multiplexer is configured to receive an input signal from a source other than an output of a multiplexer within the chain of multiplexers in the DFG. In some embodiments, the method further comprises repeating the traversing and the computing for a remainder of the chain of multiplexers in the DFG responsive to an invalid fanin-cone for an exit multiplexer of the each two consecutive exit multiplexers. In some embodiments, the chain of multiplexers includes a first non-exit multiplexer, at least one exit multiplexer, and a second non-exit multiplexer positioned in the topological order in the DFG, and wherein a data flow ordering of the first and the second non-exit multiplexers is reversed in the new DFG and the second non-exit multiplexer, the first non-exit multiplexer, and the at least one exit multiplexer are positioned in the topological order in the new DFG.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

The disclosure generally relates to the field of integrated circuits (ICs) and more particularly to a method for optimizing DFG. As described above, RTL is a design abstraction which models a synchronous digital circuit in terms of the flow of digital signals (data) between hardware components, e.g., registers, the logical operations performed on digital signals, etc. RTL abstraction is used to create high-level representations of a circuit, from which lower-level representations and ultimately actual wiring can be derived. Logic Synthesis tools parse the user design written in RTL, when compiled, and convert it into an intermediate graph-based representation called DFG. During this process if any RTL loop is present in the user design, it is unrolled in the DFG. Additionally, if the loop body contains conditional-exit statements then unrolling creates a chain of exit-multiplexers (MUXes) in the DFG. For example, RTL loops may include conditional-exit statements such as, 'exit', 'break' or 'return', which create a chain of exit multiplexers in the DFG. A DFG with a chain of exit-multiplexers results in inefficiencies and often poor QoR. In other words, it is more efficient to have a chain of multiplexers without the exit multiplexers. Accordingly, the embodiments described herein are directed to eliminating the exit multiplexers from the chain of multiplexers while achieving a same data flow. In other words, the DFG is modified and the multiplexers are reconfigured to eliminate the exit multiplexers while achieving the same data flow. For illustrative purposes, an RTL code on the left below creates a chain of exit multiplexers in DFG, when compiled, while the RTL code on the right results in the same data flow without creating a chain of exit multiplexers.

```
for (i = 0; i < N; ++i) begin      for (i = N-1; i >= 0; --i) begin
   if (S[i]) begin                    if (S[i]) begin
      out = i;                           out = i;
      break;                          end
   end                             end
end
```

One traditional technique to improve QoR of a DFG may be to change the RTL code but that results in certain time constraint limitations and it may not be feasible. Accordingly, a computer-implemented method of optimizing a DFG to remove exit multiplexers from a chain of multiplexer is disclosed.

Examples described herein relate to modification of the DFG to remove exit multiplexers resulting from compiling an RTL code with conditional exit statements in order to improve QoR. In some embodiments, the DFG is modified and multiplexers that include exit multiplexers are eliminated by: (1) select condition back-propagation; and (2) exit-chain reversal. The transformed DFG improves QoR, both in terms of logic levels and LUTs used. It is appreciated that in order to modify the DFG, the computer implemented method identifies a chain of exit multiplexers corresponding to the loop-exit paths. The method further analyzes the chain of exit multiplexers by traversing a topological order of the DFG in reverse and computing fanin-cones for each two consecutive exit multiplexers. The method further back propagates select conditions for the each two consecutive exit multiplexers if both have valid fanin-cones to generate a truth table. The method then eliminates an exit multiplexer from the each two consecutive exit multiplexers based on the truth table. The method further transforms the DFG into a new DFG wherein a data flow of the new DFG is in opposite direction to that of the DFG. The transformation process modifies a pair of multiplexers of the loop-exit multiplexers chains. Incorporating the optimization of the DFG, as disclosed, results in significant QoR improvement in comparison to the conventional method where no optimization is performed.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. For example, various methods according to some examples can include more or fewer operations, and the sequence of operations in various methods according to examples may be different than described herein. In addition, an illustrated example need not have all the aspects or advantages shown. An aspect or an advantage described in conjunction with a particular example is not necessarily limited to that example and can be practiced in any other examples even if not so illustrated or if not so explicitly described.

Some general concepts will first be described to clarify terms and nomenclature used throughout this description.

Figure 1:
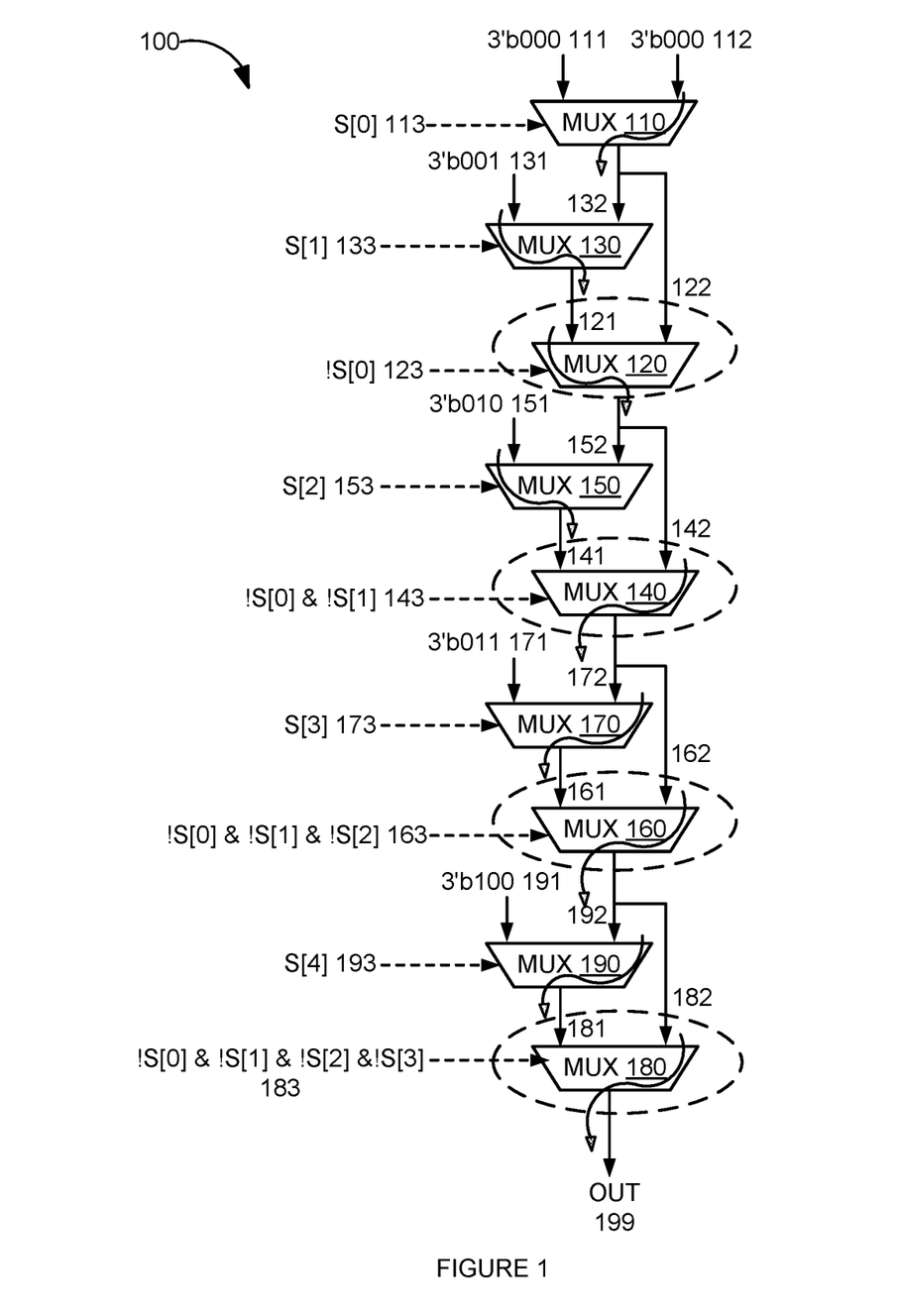
FIG. 1 shows a DFG for the register RTL with loops with conditional-exit statements, according to some examples.

Referring now to FIG. 1, a DFG 100 for the RTL with loops with conditional-exit statements, according to some embodiments is shown. In an illustrative example, the DFG 100 is generated from the RTL code below.

```
for (i = 0; i < 5; ++i)
    begin
        if (S[i]) begin
            out = i;
            break;
        end
    end
```

It is appreciated that synthesis tools can parse the user design written in RTL code and convert it into an intermediate graph-based representation like DFG when it is compiled. It is appreciated that a DFG with a chain of multiplexers including non-exit multiplexers and exit multiplexers, as shown in FIG. 1, is generated when the RTL code that includes an exit loop, such as a "break" exit statements, is compiled. It is appreciated that DFG 100, generated for the RTL code (below) and for the signal values as indicated above, includes non-exit multiplexers 110, 130, 150, 170, and 190. The DFG 100 further includes exit multiplexers 120, 140, 160, and 180 associated with a loop exit path, according to some embodiments.

For illustrative purposes, for i=0, S[0] is the select signal 113 for Mux 110; for i=1, S[1] is the select signal 133 for Mux 130; for i=2, S[2] is the select signal 153 for Mux 150; for i=3, S[3] is the select signal 173 for Mux 170; for i=4, S[4] is the select signal 193 for Mux 190. While for those exit multiplexers 120, 140, 160 and 180 associated with the "break" exit path, !S[0] is the select signal 123 for Mux 120, !S[0] & !S[1] is the select signal 143 for Mux 140, !S[0] !S[1] & !S[2] is the select signal 163 for Mux 160, !S[0] & !S[1] & !S[2] & !S[3] is the select signal 183 for Mux 180.

Furthermore, for illustrative purposes out=i and when i=0 and S[0]=1 the output signal from the Mux 110 is output signal 199, when i=1 and S[1]=1 the output signal from Mux 130 is output signal 199, when i=2 and S[2]=1 the output signal from Mux 150 is output signal 199, when i=3 and S[3]=1 the output signal from Mux 170 is output signal 199, when i=4 and S[4]=1 the output signal from Mux 190 is output signal 199. The input signals to the Mux 110 are input signals 111 and 112. The input signals to the Mux 130 are input signals 131 and 132. The input signals to the Mux 150 are input signals 151 and 152. The input signals to the Mux 170 are input signals 171 and 172. The input signals to the Mux 190 are input signals 191 and 192. Similarly, for exit multiplexers 120, 140, 160 and 180, the input signals to the Mux 120 are input signals 121 and 122. The input signals to the Mux 140 are input signals 141 and 142. The input signals to the Mux 160 are input signals 161 and 162. The input signals to the Mux 180 are input signals 181 and 182.

In some embodiments, Mux 130's input signal 132 and Mux 120's input signal 122 have the same value coming from the output of Mux 110. In some embodiments, Mux 150's input signal 152 and Mux 140's input signal 142 have the same value coming from the output of Mux 120. In some embodiments, Mux 170's input signal 172 and Mux 160's input signal 162 have the same value coming from the output of Mux 140. In some embodiments, Mux 190's input signal 192 and Mux 180's input signal 162 have the same value coming from the output of Mux 140.

It is appreciated that the generated DFG may differ from the illustrated one if the select signals have different values from the one illustrated. Moreover, the generated DFG may look different from the one illustrated if the RTL code is different. In other words, the DFG 100 shown is for illustrative purposes and should not be construed to limit the scope of the embodiments.

For illustrative purposes, the output signal of each multiplexer for the DFG 100 is its very left input signal if its select signal is asserted, i.e. true. On the other hand, the output signal of each multiplexer for the DFG 100 is its very right input signal if its select signal is de-asserted, i.e. false. For example, the output signal of Mux 150 is its left input signal 151 if its select signal S[2] 153 is true. In contrast, the output signal of Mux 150 is its right input signal 152 if its select signal S[2] 153 is false. As another example, the output signal of Mux 140 is its left input signal 141 if its select signal !S[0] & ![S[1] 143 is true. In contrast, the output signal of Mux 140 is its right input signal 142 if its select signal !S[0] & ![S[1] 143 is false.

A description of the interworking of the RTL code, as shown above, when compiled and executed is described for illustrative purposes. It is appreciated that initially when i=0, the select signal S[0] 113 is evaluated. The output signal of Mux 110 will be its left input signal 111 if its select signal S[0] 113 is true and the output signal of Mux 110 will be right input signal 112 if its select signal S[0] 113 is false. It is appreciated that the output signal of Mux 110 is the output 199 of the chain of Muxes in the DFG 100 if its select signal S[0] 113 is true because the break statement is executed and therefore i is not incremented. In contrast, if the select signal S[0] 113 of Mux 110 is false then the if statement in the RTL code is not executed and therefore the break statement will not be executed. Accordingly, i is incremented by one.

Continuing with the illustrative example, it is appreciated that now i=1 and its select signal S[1] 133 is evaluated if select signal S[0] 113 is false and i is incremented by one. The output signal of Mux 130 will be its left input signal 131 if its select signal S[1] 133 is true and the output signal of Mux 130 will be right input signal 132 if its select signal S[1] 133 is false. It is appreciated that the output signal of Mux 130 is the output 199 of the chain of Muxes in the DFG 100 if its select signal S[1] 133 is true because the break statement is executed and therefore i is not incremented. In contrast, if the select signal S[1] 133 of Mux 130 is false then the if statement in the RTL code is not executed and therefore the break statement will not be executed. Accordingly, i is incremented by one.

Continuing with the illustrative example, it is appreciated that now i=2 and its select signal S[2] 153 is evaluated if select signal S[1] 133 is false and i is incremented by one. The output signal of Mux 150 will be its left input signal 151 if its select signal S[2] 153 is true and the output signal of Mux 150 will be right input signal 152 if its select signal S[2] 153 is false. It is appreciated that the output signal of Mux 150 is the output 199 of the chain of Muxes in the DFG 100 if its select signal S[2] 153 is true because the break statement is executed and therefore i is not incremented. In contrast, if the select signal S[2] 153 of Mux 150 is false then the if statement in the RTL code is not executed and therefore the break statement will not be executed. Accordingly, i is incremented by one.

Continuing with the illustrative example, it is appreciated that now i=3 and its select signal S[3] 173 is evaluated if select signal S[2] 153 is false and i is incremented by one. The output signal of Mux 170 will be its left input signal 171 if its select signal S[3] 173 is true and the output signal of Mux 170 will be right input signal 172 if its select signal S[3] 173 is false. It is appreciated that the output signal of Mux 170 is the output 199 of the chain of Muxes in the DFG 100 if its select signal S[3] 173 is true because the break statement is executed and therefore i is not incremented. In contrast, if the select signal S[3] 173 of Mux 170 is false then the if statement in the RTL code is not executed and therefore the break statement will not be executed. Accordingly, i is incremented by one.

Continuing with the illustrative example, it is appreciated that now i=4 and its select signal S[4] 193 is evaluated if select signal S[3] 173 is false and i is incremented by one. The output signal of Mux 190 will be its left input signal 191 if its select signal S[4] 193 is true and the output signal of Mux 190 will be right input signal 192 if its select signal S[4] 193 is false. It is appreciated that the output signal of Mux 190 is the output 199 of the chain of Muxes in the DFG 100 since it's the last multiplexer in this illustrative DFG 100 and the "for" loop comes to its end.

As described, the RTL code is compiled and subsequently generate the DFG 100, as shown in FIG. 1. Following the logic and the loop iteration of the RTL code, as described above, the output signal of Mux 110 should be routed through the chain of Muxes (i.e., Muxes 130, 120, 150, 140, 170, 160, 190 and 180) to be output as output signal 199 if the select signal S[0] 113 of Mux 110 is true. As illustrated, routing through the entire chain of Muxes to route the output of Mux 110 as output signal 199 when its select signal S[0] 113 is true is inefficient.

Similarly, the output signal of Mux 130 should be routed through the chain of Muxes (i.e., Muxes 120, 150, 140, 170, 160, 190 and 180) to be output as output signal 199 if select signal S[0] 113 is false and the select signal S[1] 133 of Mux 130 is true. As illustrated, routing through the entire chain of Muxes to route the output of Mux 130 as output signal 199 when its select signal S[1] 133 is true is inefficient.

Similarly, the output signal of Mux 150 should be routed through the chain of Muxes (i.e., Muxes 140, 170, 160, 190 and 180) to be output as output signal 199 if select signals !S[0] & !S[1] 143 are false and the select signal S[2] 153 of Mux 150 is true. As illustrated, routing through the entire chain of Muxes to route the output of Mux 150 as output signal 199 when its select signal S[2] 153 is true is inefficient.

Similarly, the output signal of Mux 170 should be routed through the chain of Muxes (i.e., Muxes 160, 190 and 180) to be output as output signal 199 if select signals S[0] 113, S[1] 133, and S[2] 153 are false and the select signal S[3] 173 of Mux 170 is true. As illustrated, routing through the entire chain of Muxes to route the output of Mux 170 as output signal 199 when its select signal S[3] 173 is true is inefficient.

Similarly, the output signal of Mux 190 should be routed through the chain of Muxes (i.e., Mux 180) to be output as output signal 199 if select signals S[0] 113, S[1] 133, S[2] 153, and S[3] 173 are false and the select signal S[4] 193 of Mux 190 is true. As illustrated, routing through another exit multiplexer Mux 180 to route the output of Mux 190 as output signal 199 when its select signal S[4] 193 is true is inefficient.

In an illustrative example, for a truth table below in Table 1 with the following S[0]-S[4] signals, a data flow through the DFG 100 is shown in FIG. 1.

TABLE 1

| Signal | Value |
| --- | --- |
| S[0] | False |
| S[1] | True |
| S[2] | True |
| S[3] | False |
| S[4] | False |

First, by the logic of the RTL, it can be shown that since S[0] is false and S[1] is true, the output of the RTL code is 1 (output=i; i equals to 1 since S[1] is true); then the "break" is executed. The rest of S[2], S[3] and S[4] does not matter as the RTL code already exits the loop. Accordingly, if the same S[0]-S[4] select signals in Table 1 are inserted into the DFG 100, similar logic would apply. Following the data flow going through DFG 100, first at Mux 110, its output is its right input signal 112 since select signal S[0] 113 is false. Next at Mux 130, its output is its left input signal 131 (which in this illustrative example is an external signal of 3'b001) since select signal S[1] 133 is true. Next at Mux 120, since its select signal !S[0] 123 is true, its output is its left input signal 121 which is the output signal of Mux 130 (which is 3'b001 as shown above). Next at Mux 150, the output is its left input signal 151 (which is in this illustrative example is an external signal 3'b010) since its select signal S[2] 153 is true. Next at Mux 140, its select signal !S[0] & !S[1] 143 is false (since S[0] is false and S[1] is true), so the output of Mux 140 is its right input signal 142 which comes from the output signal of Mux 120 (which is 3'b001 as shown above). Next at Mux 170, its output is its right input signal 172 which is the output signal from Mux 140 (which is 3'b001 as shown above) since its select signal S[3] 173 is false. Next at Mux 160, since its select signal !S[0] & !S[1] & !S[2] 163 is false (since S[1] and S[2] are true), the output of Mux 160 is its right input signal 162 which is output signal of Mux 140 (which is 3'b001 as shown above). Next at Mux 190, its output is its right input signal 192, which is the output of multiplexer 106 (which is 3'b001 as shown above), since its select signal S[4] 193 is false. Finally at Mux 180, the output is its right input signal 182, which is output signal of Mux 160 (which is 3'b001 as shown above), since its select signal !S[0] & !S[1] & !S[2] & !S[3] 183 is false (since S[1] or S[2] are true). Therefore, for this specific truth table with the combination of the five selection signals S[0] to S[4] (False, True, True, False & False), both the RTL and the DFG 100 arrive at the same output results. Yet the existence of exit multiplexers 120, 140, 160 & 180 in the chain of multiplexers brings the DFG a bad QoR and decreases the performance of the DFG.

It is appreciated that if the exit multiplexers could be identified and eliminated, the performance of the DFG will be largely increased. In some embodiments, it is appreciated that an exit multiplexer is configured to receive all its input signals from outputs of other multiplexers in the DFG. For example, an exit multiplexer Mux 120 receives its two input signals 121 and 122 from the outputs of Mux 130 and Mux 110. In another example, an exit multiplexer Mux 140 receives its two input signals 141 and 142 from the outputs of Mux 150 and Mux 120. Similarly, an exit multiplexer Mux 160 receives its two input signals 161 and 162 from the outputs of Mux 170 and Mux 140. Similarly, an exit multiplexer Mux 180 receives its two input signals 181 and 182 from the outputs of Mux 190 and Mux 160. Hence, it is appreciated that when a multiplexer receives all its input signals from outputs of other multiplexers in the DFG, an exit multiplexer has been identified.

In some embodiments, an exit multiplexer is configured to receive at least one input signal from a multiplexer other than its immediately preceding multiplexer in the DFG. For example, Mux 120 receives two input signals 121 and 122 from the outputs of Mux 110 and Mux 130. While Mux 130 is the immediately preceding multiplexer of Mux 120 in the DFG, Mux 110 is not. Similarly for Mux 140, it receives one input signal 141 from the output of Mux 150, an immediately preceding multiplexer of itself in the DFG. Mux 140 also receives another input signal 142 from the output of Mux 120, which is not its immediately preceding multiplexer. Similarly for Mux 160, it receives one input signal 161 from the output of Mux 170, an immediately preceding multiplexer of itself in the DFG. Mux 160 also receives another input signal 162 from the output of Mux 140, which is not its immediately preceding multiplexer. Similarly for Mux 180, it receives one input signal 181 from the output of Mux 190, an immediately preceding multiplexer of itself in the DFG. Mux 180 also receives another input signal 182 from the output of Mux 160, which is not its immediately preceding multiplexer. Therefore, it is appreciated that when a multiplexer is configured to receive at least one input signal from a multiplexer other than its immediately preceding multiplexer in the DFG, an exit multiplexer has been identified.

In some embodiments, it is appreciated that a non-exit multiplexer is configured to receive an input signal from a source other than an output of a multiplexer within the chain of multiplexers in the DFG. For example, Mux 110 receives input signals 111 and 112 from a source other than an output of another multiplexer, which in one illustrative example are 3'b000. In another example, Mux 130 receives input signal 131 from a source other than an output of another multiplexer, which in one illustrative example is 3'b001. Similarly, Mux 150 receives input signal 151 from a source other than an output of another multiplexer, which in one illustrative example is 3'b010. Similarly, Mux 170 receives input signal 171 from a source other than an output of another multiplexer, which in one illustrative example is 3'b011. Similarly, Mux 190 receives input signal 191 from a source other than an output of another multiplexer, which in one illustrative example is 3'b100. Hence, it is appreciated that if a multiplexer is configured to receive an input signal from a source other than an output of a multiplexer within the chain of multiplexers in the DFG, a non-exit multiplexer has been identified.

In some further embodiments, a non-exit multiplexer is configured to receive another input signal from an output of another multiplexer within the chain of the multiplexers in the DFG. For example, Mux 130 receives input signal 132 from the output of Mux 110. As another example, Mux 150 receives input signal 152 from the output of Mux 120. In another example, Mux 170 receives input signal 172 from the output of Mux 140. Similarly, Mux 190 receives input signal 192 from output of Mux 160.

In some embodiments, at least one non-exit multiplexer is positioned in between each two consecutive exit multiplexers. For example, non-exit Mux 150 is positioned between two consecutive exit multiplexers Mux 120 and Mux 140. Similarly, non-exit Mux 170 sits between exit multiplexers Mux 140 and Mux 160. Accordingly, non-exit Mux 190 between exit multiplexers Mux 160 and Mux 180.

In some embodiments, RTL loops with different number of outputs and different variations of conditional-exit statements such as, 'exit', 'break' or 'return', create one or more chains of exit multiplexers in the DFG. The following RTL code illustrates one of these variations.

```
for (i = 0; i < 5: i += 1)
    begin
        if (S[i]) begin
            out2 = out1;
            out1 = i
            break:
        end
    end
```

In this illustrative example, RTL code shown above will generate a DFG with two chains of exit multiplexers for variables out1 and out2. It is appreciated that the optimization techniques described in the disclosed embodiments would be applicable to RTL loops with different number of outputs and different variations of conditional-exit statements.

Figure 2A:
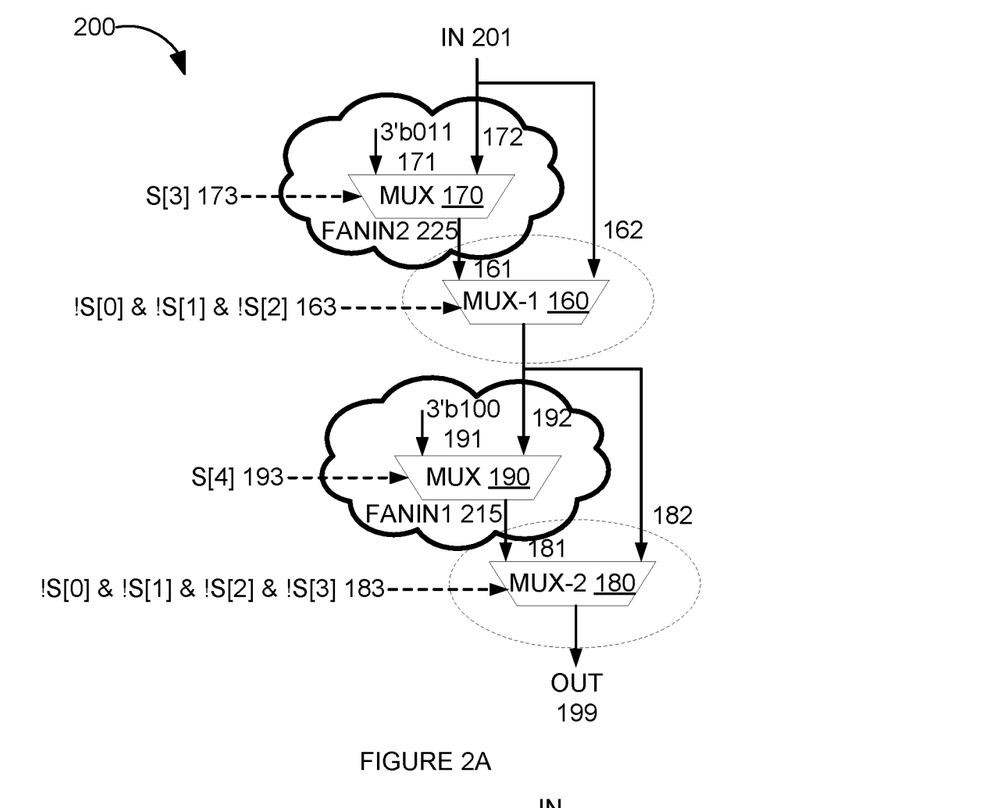
FIG. 2A shows a DFG portion of FIG. 1 with two non-exit multiplexers and exit multiplexers, according to some examples.

Referring now to FIG. 2A, a DFG portion of FIG. 1 with two non-exit multiplexers and exit multiplexers, according to some embodiments depicted in FIG. 1, is shown. In this illustrative example, for this portion of DFG with Muxes 170, 160, 190 and 180, the input signal is IN 201 and its output is OUT 199. Following the logic and the loop iteration of the RTL code, as described above, the IN 201 signal of the DFG 200 should be routed through the chain of Muxes (i.e., Muxes 170, 160, 190 and 180) to be output as output signal 199 if at least one of previous select signals S[0], S[1] and S[2] is true. As illustrated, routing through the entire chain of Muxes to route the input signal IN 201 as output signal 199 when at least one of previous select signals S[0], S[1] and S[2] is true is inefficient.

Similarly, the output signal of Mux 170 should be routed through the chain of Muxes (i.e., Muxes 160, 190 and 180) to be output as OUT 199 if all previous select signals S[0], S[1] and S[2] are false and the select signal S[3] 173 of Mux 170 is true. As illustrated, routing through the entire chain of Muxes to route the output of Mux 170 as output signal 199 when its select signal S[3] 173 is true is inefficient.

Similarly, the output signal of Mux 190 should be routed through the chain of Muxes (i.e., Mux 180) to be output as OUT 199 if all previous select signals S[0], S[1], S[2] and S[3] are false and the select signal S[4] 193 of Mux 190 is true. As illustrated, routing through another exit multiplexer Mux 180 to route the output of Mux 190 as output signal 199 when its select signal S[4] 193 is true is inefficient.

It is appreciated that in order to optimize the DFG, the topological order of DFG is traversed in reverse. Using identification techniques described above, it is appreciated that both Mux 170 and Mux 190 are configured to receive an input signal (In one illustrative example, 3'b011 for input signal 171 and 3'b100 for input signal 191 respectively) from a source other than an output of a multiplexer within the chain of multiplexers in the DFG. Hence, both multiplexers 170 and 190 are non-exit multiplexers. For Mux 160, it is appreciated that it is configured to receive all its input signals from outputs of other multiplexers in the DFG (Mux 170 and IN 201 which is an output of another Mux 140 in FIG. 1). For Mux 180, it is appreciated that it is configured to receive all its input signals from outputs of other multiplexers in the DFG (Mux 170 and Mux 160). It is also appreciated that multiplexers 160 and 180 are configured to receive at least one input signal from a multiplexer other than its immediately preceding multiplexer in the DFG (IN 201 for Mux 160, and Mux 160 for Mux 180). Hence, both Mux 160 and Mux 180 are identified as two consecutive exit multiplexers in the DFG.

In an illustrative example, fanin-cones for each of these two consecutive exit multiplexers (i.e. 160 and 180) are computed. As shown in FIG. 2A, fanin-cone of exit Mux 160 is FANIN2 225, which is the output of Mux 170 for this DFG. Similarly, fanin-cone of exit Mux 180 is FANIN1 215, which is the output of Mux 190 for this DFG. It is appreciated that a fanin-cone of an exit multiplexer is valid when input signals for the exit multiplexer is an output from preceding multiplexer within the chain in the DFG. Since FANIN2 225 and FANIN1 215 are the outputs of Mux 170 and Mux 190 respectively, both are deemed valid for the purpose of optimization process disclosed herein. In some embodiments, if fanin-cones of two consecutive exit multiplexers are both valid, select conditions for the each two consecutive exit multiplexers will be back propagated to generate a truth table. In some embodiments, if a fanin-cone of an exit multiplexer is invalid, the traversing and the computing disclosed herein will be repeated for a remainder of the chain of multiplexers in the DFG.

In some embodiments, each two consecutive exit multiplexers comprises a first exit multiplexer and a second exit multiplexer. In some further embodiments, the second exit multiplexer receives at least one input signal from the first exit multiplexer. For example, in the DFG 200 of FIG. 2A, Mux 160 and Mux 180 are two consecutive exit multiplexers, wherein Mux 160 is the first exit multiplexer wherein the second exit Mux 180 receives at least one input signal from the first exit Mux 160.

In some embodiments, responsive to the two valid fanin-cones for the two consecutive exit multiplexers, select conditions for the each two consecutive exit multiplexers can be back propagated to generate a truth table. The following truth table is an illustrative example of back propagation of select conditions for exit multiplexers Mux 160 and Mux 180 described in FIG. 2A.

TABLE 2

| !S[0] & !S[1] & !S[2] | !S[3] | Out |
|---|---|---|
| 0 | X | IN |
| 1 | 0 | 3'b011 |
| 1 | 1 | FANIN1 |

In one illustrative example, select signal !S[0] & !S[1] & !S[2] & !S[3] 183 for exit Mux 180 is 0 (false) when select signal !S[0] & !S[1] & !S[2] 163 for exit Mux 160 is 0 (false), regardless of the value of !S[3]. Therefore, the value of the right input signals 162 and 182 for each of the Muxes 160 and 180 respectively are routed as the output signal for each of the Muxes 160 and 180 respectively. Accordingly, the IN 201 is routed as the output OUT 199 of the DFG 200 when select signal !S[0] & !S[1] & !S[2] 163 is false.

In another illustrative example, select signal !S[0] & !S[1] & !S[2] & !S[3] 183 for exit multiplexer 180 is 0 (false) when select signal !S[0] & !S[1] & !S[2] 163 for exit multiplexer 160 is 1 (true) and !S[3] is 0 (false). Hence, the value of its left input signal 171, which is 3'b011 in this illustrative example, is routed to be the output FANIN2 225 of Mux 170. Continually, the value of its left input signal 161 is routed to be the output of Mux 160. And the value of its right input signal 182 is routed to be the output of Mux 180. Therefore, FANIN2 225, which is 3'b011 in this illustrative example, is routed as the output OUT 199 of the DFG 200 when select signal !S[0] & !S[1] & !S[2] 163 is true and !S[3] is false.

In another illustrative example, select signal !S[0] & !S[1] & !S[2] & !S[3] 183 for exit Mux 180 is 1 (true) when select signal !S[0] & !S[1] & !S[2] 163 for exit Mux 160 is 1 (true) and !S[3] is 1 (true). Hence, the value of its left input signal 181, which is FANIN1 215, is routed to be the output of exit Mux 180. Accordingly, FANIN1 215 is routed as the output OUT 199 of the DFG 200 when select signal !S[0] & !S[1] & !S[2] 163 is true and !S[3] is also true.

In some embodiments, based on the truth table with different combinations of select signals !S[0] & !S[1] & !S[2] and !S[3], an exit multiplexer could be eliminated to achieve the same input/output for the portion of DFG shown in FIG. 2A. For example, exit multiplexer Mux 180 may be eliminated to achieve the same output result as shown in FIG. 2A. It is appreciated that, after eliminating an exit multiplexer based on the truth table, the DFG achieves the same output results for the same input signals and select signals. In some embodiments, optimization techniques are used to transform a DFG in FIG. 2A to form a new DFG with the same input/output results based on the truth table described above.

Figure 2B:
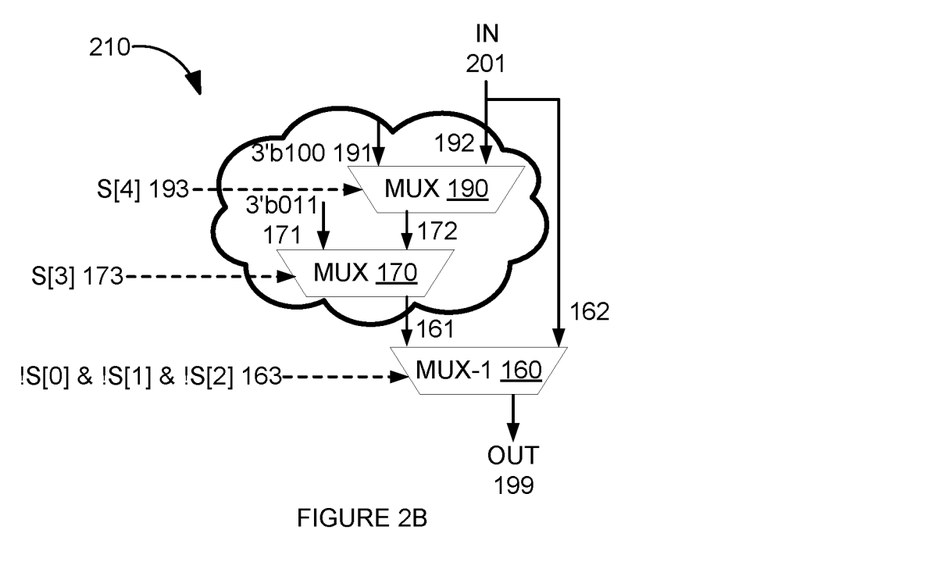
FIG. 2B shows a transformation of the DFG of FIG. 2A to remove the exit multiplexer, according to some examples.

Referring now to FIG. 2B, a transformation of the DFG of FIG. 2A to remove the exit multiplexer, according to some examples, is shown. Similar to FIG. 2A, the new DFG 210 also includes non-exit multiplexers Mux 170 and Mux 190 and exit Mux 160. Unlike FIG. 2A, the new DFG 210 does not have exit Mux 180. The new DFG 210 will generate the same truth table based on the truth table of select signals !S[0] & !S[1] & !S[2] 163 of exit Mux 160 and !S[0] & !S[1] & !S[2] & !S[3] 183 of exit Mux 180.

In some embodiments, two consecutive exit multiplexers comprises a first exit multiplexer and a second exit multiplexer. In some further embodiments, the second exit multiplexer receives at least one input signal from the first exit multiplexer of the DFG. In one illustrative example, in the DFG 200 of FIG. 2A, the second exit Mux 180 receives at least one input signal 182 from the output of the first exit Mux 160.

In some embodiments, select signals of the first and the second exit multiplexers are back propagated through the fanin-cone of the second exit multiplexer. In one illustrative example, in the DFG 200 of FIG. 2A, select signals of exit multiplexers 160 and 180—!S[0] & !S[1] & !S[2] 163 and !S[0] & !S[1] & !S[2] & !S[3] 183—are back propagated through FANIN1 215 of exit Mux 180 to transform to the new DFG 210 of FIG. 2B. As described above, for DFG 200 in FIG. 2A, the output of non-exit Mux 190, which is FANIN1 215, is routed to be the output OUT 199 when select signals !S[0] & !S[1] & !S[2] 163=1 and !S[3]=1. While for the new DFG 210 in FIG. 2B, the value of its right input signal 172, which is FANIN1 215, is routed to be the output of non-exit Mux 170 when the select conditions of !S[0] & !S[1] & !S[2] 163=1 and !S[3]=1. The output of Mux 170, FANIN1 215, is then routed to be the output OUT 199 of the new DFG. Therefore, for the combination of select conditions of !S[0] & !S[1] & !S[2]=1 and !S[3]=1, the output OUT 199 of the new DFG 210 in FIG. 2B arrives at a result of FANIN1 215, exactly the same as the output OUT 199 of the DFG 200 in FIG. 2A.

In some embodiments, select signals of the first and the second exit multiplexers are back propagated through the fanin-cone of the first exit multiplexer. In one illustrative example, in the DFG 200 of FIG. 2A, select signals of exit multiplexers Mux 160 and Mux 180—!S[0] & !S[1] & !S[2]

163 and !S[0] & !S[1] & !S[2] & !S[3] 183—are back propagated through FANIN2 225 of exit Mux 160 to transform to the new DFG 210 in FIG. 2B. As described above, for DFG 200 in FIG. 2A, the output of non-exit Mux 170, which is the FANIN2 225 (essentially 3'b011 171 in the truth table), is routed to be the output OUT 199 when select signals !S[0] & !S[1] & !S[2] 163=1 and !S[3]=0. While for the new DFG 210 in FIG. 2B, the left input signal 171 (which in one illustrative example is 3'b011) of Mux 170 is routed to be its output since S[3]=1. The output signal of Mux 170 will be then routed as the output OUT 199 of the new DFG 210 since select signals !S[0] & !S[1] & !S[2] 163=1. Therefore, for the combination of select conditions of !S[0] & !S[1] & !S[2] 163=1 and !S[3]=0, OUT 199 of the new DFG 210 in FIG. 2B arrives at a result of input signal 171 (which in one illustrative example is 3'b011), exactly the same as the OUT 199 of the DFG 200 in FIG. 2A.

In some embodiments, select signals of the first and the second exit multiplexers are back propagated through the first exit multiplexer. In one illustrative example, in the DFG 200 of FIG. 2A, select signals of exit multiplexers Mux 160 and Mux 180—!S[0] & !S[1] & !S[2] 163 and !S[0] & !S[1] & !S[2] & !S[3] 183 respectively—are back propagated through exit Mux 160 in the new DFG 210 of FIG. 2B. As described above, for DFG 200 in FIG. 2A, the input signal IN 201 is routed to be the output OUT 199 when the select conditions of !S[0] & !S[1] & !S[2] 163=0, regardless the value of !S[3]. While in the new DFG 210 in FIG. 2B, the input signal IN 201 is routed to be the output OUT 199 when the select conditions of !S[0] & !S[1] & !S[2] 163=0. Therefore, for the combination of select conditions of !S[0] & !S[1] & !S[2] 163=1 and !S[3]=X (either 0 or 1), the output OUT 199 of the new DFG 210 in FIG. 2B arrives at a result of IN 201, exactly the same as the output OUT 199 of the DFG 200 in FIG. 2A.

In some embodiments, based on the truth table generated from the back propagations of select conditions for the each two consecutive exit multiplexers, a DFG is transformed to a new DFG. In some embodiments, a DFG is transformed to a new DFG after the elimination of one exit multiplexer. In some embodiments, a data flow of the new DFG is in opposite direction to that of the DFG. In some embodiments, wherein the chain of multiplexers includes a first non-exit multiplexer, at least one exit multiplexer, and a second non-exit multiplexer positioned in the topological order in the DFG, and wherein a data flow ordering of the first and the second non-exit multiplexers is reversed in the new DFG and the second non-exit multiplexer, the first non-exit multiplexer, and the at least one exit multiplexer are positioned in the topological order in the new DFG.

In one illustrative example, the DFG 200 in FIG. 2A is transformed to a new DFG 210 in FIG. 2B after the elimination of one exit Mux 180. In one aspect, data flow of the new DFG 210 in FIG. 2B is in opposite direction to that of the DFG 200 in FIG. 2A. In DFG 200 in FIG. 2A, one exit Mux 160 is positioned between a first non-exit Mux 170 and a second non-exit Mux 190; and data flow goes from non-exit Mux 170 to Mux 190. While in the new DFG 210 shown in FIG. 2B, the data flow ordering of the first non-exit Mux 170 and the second non-exit Mux 190 is reversed and exit multiplexer Mux 180 has been eliminated in the new DFG 210. In the new DFG 210, Mux 190, Mux 170 and Mux 160 are positioned in topological order.

Figure 3:
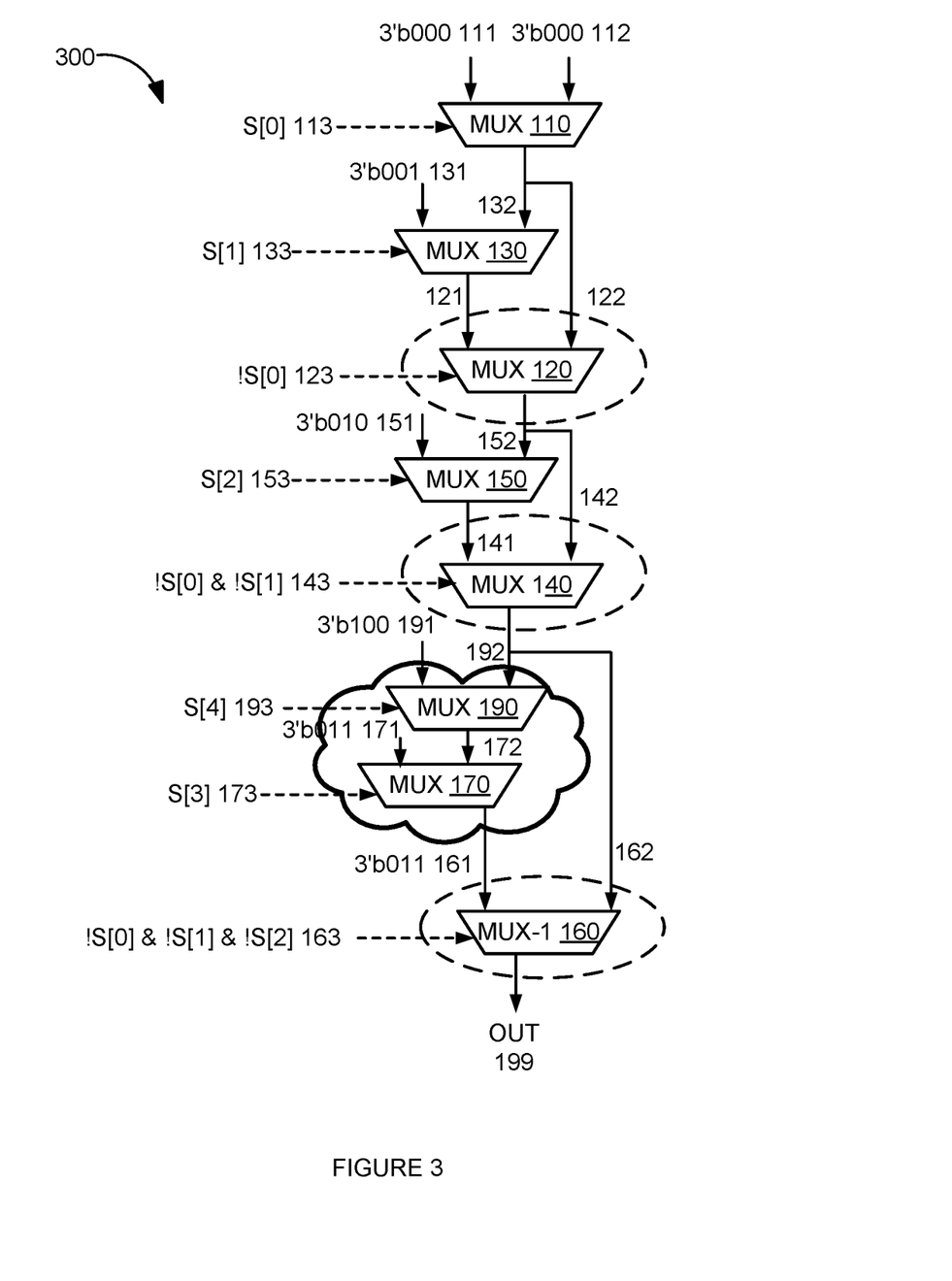
FIG. 3 shows a DFG of FIG. 1 modified by DFG of FIG. 2B, according to some examples.

Referring now to FIG. 3, a DFG of FIG. 1 modified by DFG of FIG. 2B, according to some examples, is shown. It is appreciated that the process as described in FIGS. 2A-2B is repeated for the DFG 300. In other words, the DFG 300 is traversed in reverse topological order, as described above. In an illustrative example, the DFG 310 is traversed as described above with respect to FIGS. 2A-2B. Exit multiplexers can similarly be eliminated. For example, exit multiplexers 180, 160, 140 and 120 can be eliminated to form a new DFG.

In some embodiments, the optimization techniques disclosed herein starts from traversing a topological order of the DFG in reverse. In an illustrative example, for the DFG 310, the optimization process starts from non-exit multiplexers Mux 170 and Mux 190 and exit multiplexers Mux 160 and Mux 180 (eliminated). The transformation includes eliminating exit Mux 180 from the chain, and a data flow ordering of non-exit multiplexers 170 and Mux 190 is reversed in the new DFG 310. In addition, after the maneuver of the top reverse ordered non-exit multiplexers Mux 170 and 190 and exit multiplexers Mux 160 and 180, the optimization process will be repeated in reverse order all the way up to multiplexers Mux 140, Mux 150, Mux 120, Mux 130, and Mux 110, etc.

In one illustrative example, the DFG 100 in FIG. 1 is transformed to a new DFG 300 in FIG. 3 after the elimination of one exit Mux 180. In one aspect, data flow of the new DFG 301 in FIG. 3 is in opposite direction to that of the DFG 100 in FIG. 1. In DFG 100 in FIG. 1, one exit Mux 160 is positioned between a first non-exit Mux 170 and a second non-exit Mux 190. And data flow goes from non-exit Mux 170 to Mux 190. While in the new DFG 300 shown in FIG. 3, the data flow ordering of the first non-exit Mux 170 and the second non-exit Mux 190 is reversed and exit multiplexer Mux 180 has been eliminated in the new DFG 300. In the new DFG 300, Mux 190, Mux 170 and Mux 160 are positioned in topological order. Eventually, the topological order of non-exit multiplexers will be all reversed. For example, in the new DFG 300, non-exit multiplexers 190, 170, 150, 130 and 110 will eventually be positioned in this topological order.

Figure 4:
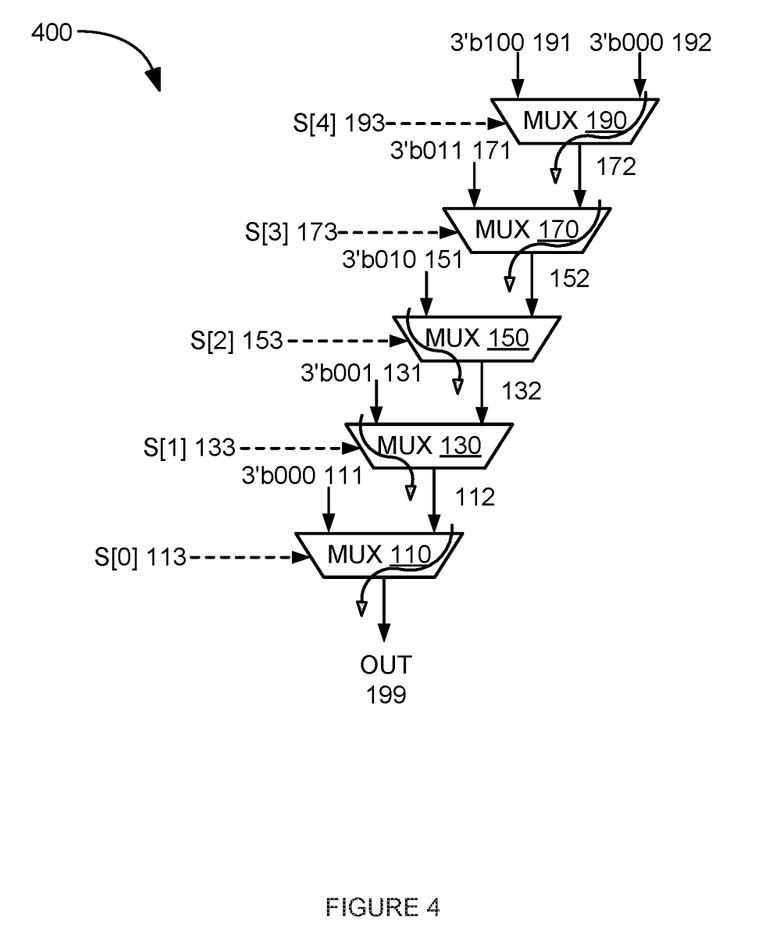
FIG. 4 shows a transformation of the DFG of FIG. 1 into a new DFG without exit multiplexers, according to some examples.

Referring now to FIG. 4, a transformation of the DFG of FIG. 1 into a new DFG without exit multiplexers, according to some examples, is shown. In some embodiments, a DFG with exit multiplexers is transformed to a new DFG with exit multiplexers all eliminated based on truth table, wherein a data flow of the new DFG is in reverse order in comparison to the original DFG. It is appreciated that the DFG of FIG. 1 is traversed in reverse, as described in FIGS. 2A-3, until all exit multiplexers are eliminated while maintaining the input/output of the DFG. For example, once the process is repeated, exit multiplexers 180, 160, 140 and 120 are eliminated.

In an illustrative example, the transformation from DFG 100 in FIG. 1 to a new DFG 300 in FIG. 3 will be repeated for all the multiplexers in reverse order. In FIG. 3, exit Mux 180 is eliminated and data flow ordering of non-exit multiplexers Mux 170 and Mux 190 is reversed (non-exit Mux 170 is receiving input signal 171 from the output of Mux 190 now). Accordingly, traversing from the reverse topological order, exit multiplexers Mux 160, Mux 140, and Mux 120 will all be eliminated in that order. In addition, the data flow ordering between Muxes 170/190 block and Mux 150, Muxes 150/170/190 block and Mux 130, Muxes 130/150/170/190 block and Mux 110 will also be reversed in that order. It is appreciated that eventually after traversing of the whole DFG, computing of the fanin-cones, back propagating of select conditions, eliminating of exit multiplexers, and reversing order of non-exit multiplexers, all the exit multiplexers (Muxes 180/160/140/120) will be eliminated and non-exit multiplexers (Muxes 190/170/150/130/110) will be reversed order. In an illustrative example, a DFG 100 in FIG. 1 is transformed to a new DFG 400, which includes data flow from Muxes 190, 170, 150, 130, and 110 in that order.

It is appreciated that an RTL code without exit-loop would also generate a DFG without exit multiplexers such as the new DFG 400 in FIG. 4. The following RTL code is an illustrative example.

```
for (i = 4; i >= 0; --i) begin
    if (S[i]) begin
        out = i;
    end
end
```

However, this kind of DFG could only be generated from RTL code without conditional-exit statements. Wherein there are exit-loops in RTL, the converted DFG from the RTL code would include many exit multiplexers that heavily decrease the QoR of DFG. It is appreciated that DFG optimization techniques disclosed herein would achieve a new DFG like DFG 400 in FIG. 4 without going back to manually modifying RTL code.

Figure 5:
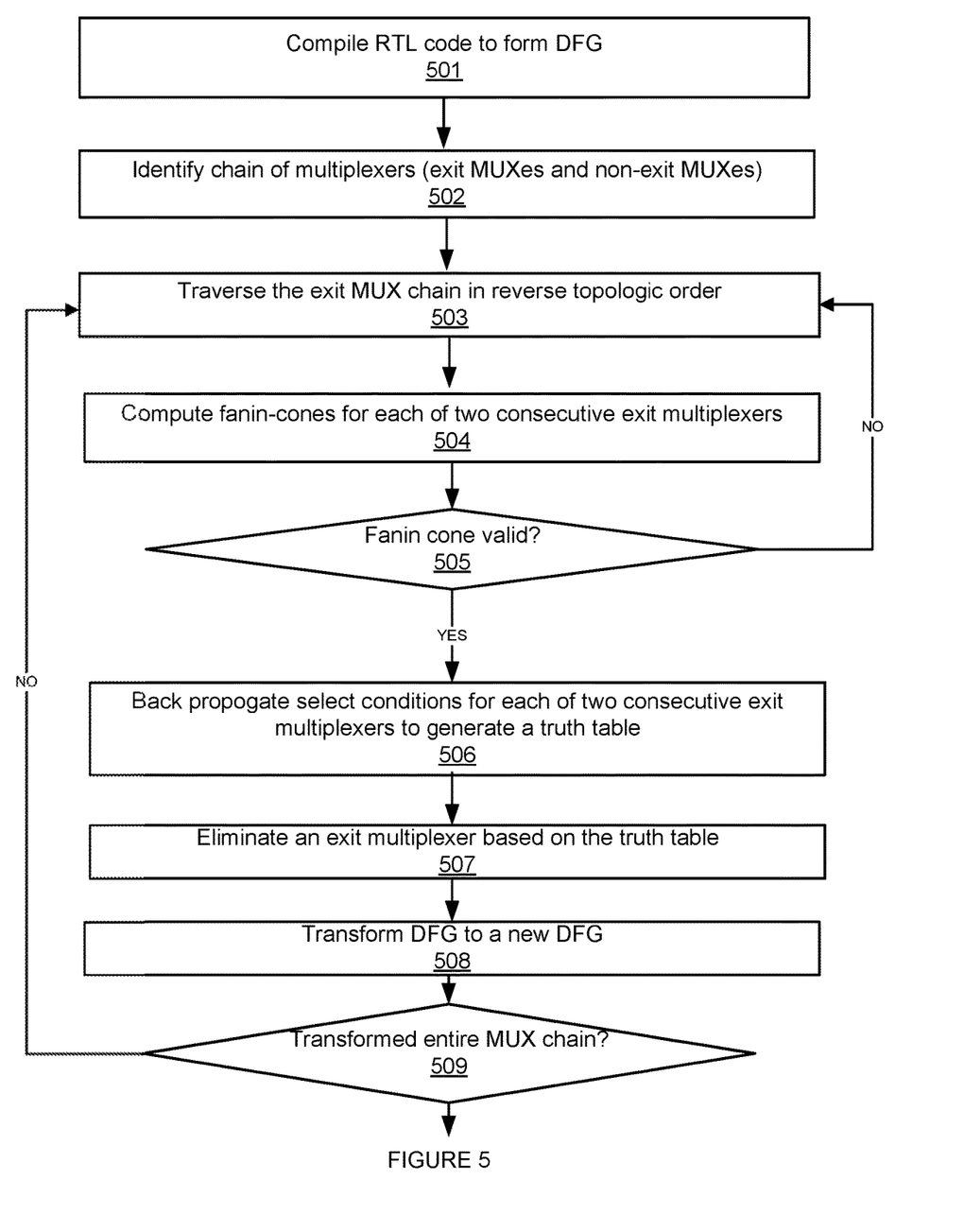
FIG. 5 shows a flow chart diagram to optimize a DFG by removing exit multiplexers, according to some examples.

Referring now to FIG. 5, a flow chart diagram to optimize a DFG by removing exit multiplexers, according to some examples is shown. In some embodiments, the DFG optimization includes a step 501, compiling a RTL code to form a DFG. In some embodiments, at step 501 the DFG is received without having to compile the RTL code.

At step 502, a chain of multiplexers that includes exit multiplexers associated with a loop exit path and non-exit multiplexers is identified. It is appreciated that exit multiplexers and non-exit multiplexers are configured in different ways regarding their inputs in the DFG and could be identified using the techniques disclosed above. After identifying exit multiplexers and non-exit multiplexers in the DFG, consecutive exit-multiplexers may be found.

At step 503, a topological order of the DFG is traversed in reverse order, as described above with respect to FIGS. 1-3. In an illustrative example, the DFG in FIG. 1 is traversed in reverse order to form a new DFG. The DFG optimization will start traversing from non-exit multiplexers Mux 170 and Mux 190 and exit multiplexers Mux 160 and Mux 180; then going all the way up to multiplexers Mux 140, Mux 150, Mux 120, Mux 130, Mux 110, etc.

In some embodiments, the DFG optimization includes a step 504, a fanin-cone for each two consecutive exit multiplexers is computed, as described above with respect to FIGS. 2A-3.

In some embodiments, the DFG optimization includes a step 505, the validity of the fanin-cones is determined. It is appreciated that a fanin-cone of an exit multiplexer is valid when input signals for the exit multiplexer is an output from preceding multiplexer within the chain in the DFG. In an illustrative example, as shown in FIG. 2A, since FANIN2 225 and FANIN1 215 are the outputs of Mux 170 and Mux 190 respectively, both are deemed valid for the purpose of optimization process disclosed herein. If fanin-cones are valid, then optimization process goes to step 506 for back propagation. It is appreciated that steps 503-504 are repeated for a remainder of the chain of multiplexers in the DFG if the fanin-cone of an exit multiplexer is invalid.

At step 506, select conditions for each two consecutive exit multiplexers are back propagated to generate a truth table, as described with respect to FIGS. 1-3.

In some embodiments, the DFG optimization include a step 507, an exit multiplexer is eliminated based on the truth table, as described with respect to FIGS. 1-3.

In some embodiments, at step 508, a DFG is transformed to a new DFG after the elimination of an exit multiplexer, as described with respect to FIGS. 1-3.

In some embodiments, at step 509, a new DFG will be checked to see whether the entire Mux chain has been transformed, i.e., no exit Mux left in the DFG, as described with respect to FIGS. 1-4. Through steps 501-508, a DFG in FIG. 1 has been transformed to a new DFG in FIG. 3 by eliminating one exit multiplexer. At step 509, this transformation will be repeated for steps 503-508 until all exit multiplexers have been eliminated in the new DFG. Hence, in an illustrative example, a DFG in FIG. 1 will be transformed into a new DFG in FIG. 4.

Figure 6:
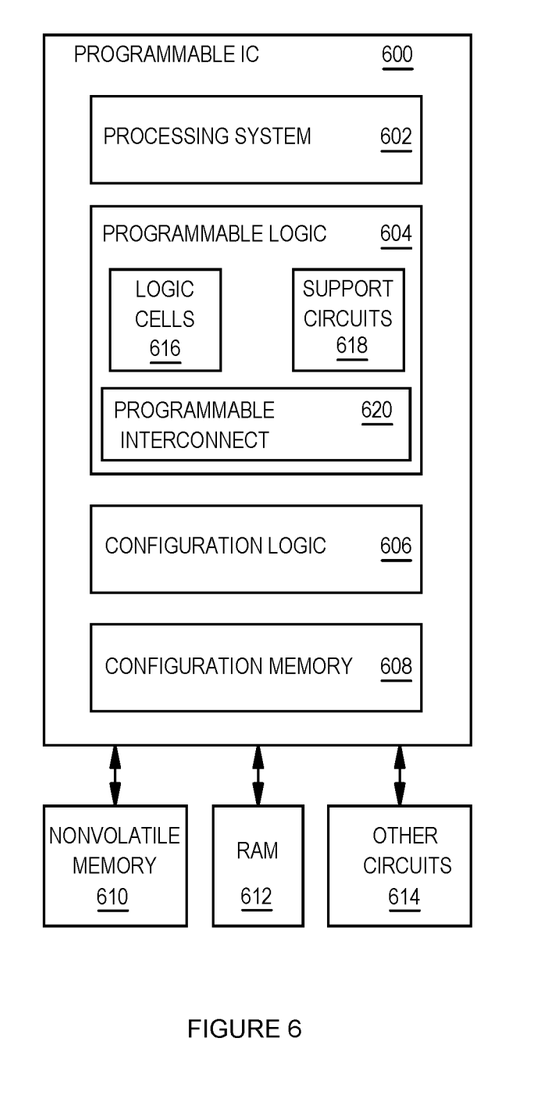
FIG. 6 shows a block diagram depicting a programmable integrated circuit (IC), according to some examples.

FIG. 6 is a block diagram depicting a programmable integrated circuit (IC) 600 according to an example. The programmable IC 900 can implement the integrated circuit (IC) chip of systems of FIGS. 1-5, in whole or in part. The programmable IC 600 includes a processing system 602, programmable logic 604, configuration logic 606, and configuration memory 608. The programmable IC 600 can be coupled to external circuits, such as nonvolatile memory 610, RAM 612, and other circuits 614.

In the example of FIG. 6, the processing system 602 can include microprocessor(s), memory, support circuits, 10 circuits, and the like. The programmable logic 604 includes logic cells 616, support circuits 618, and programmable interconnect 620. The logic cells 616 include circuits that can be configured to implement general logic functions of a plurality of inputs. The support circuits 618 include dedicated circuits, such as transceivers, input/output blocks, digital signal processors, memories, and the like. The logic cells and the support circuits 618 can be interconnected using the programmable interconnect 620. Information for programming the logic cells 616, for setting parameters of the support circuits 618, and for programming the programmable interconnect 620 is stored in the configuration memory 608 by the configuration logic 606. The configuration logic 906 can obtain the configuration data from the nonvolatile memory 610 or any other source (e.g., the RAM 612 or from the other circuits 614).

Figure 7:
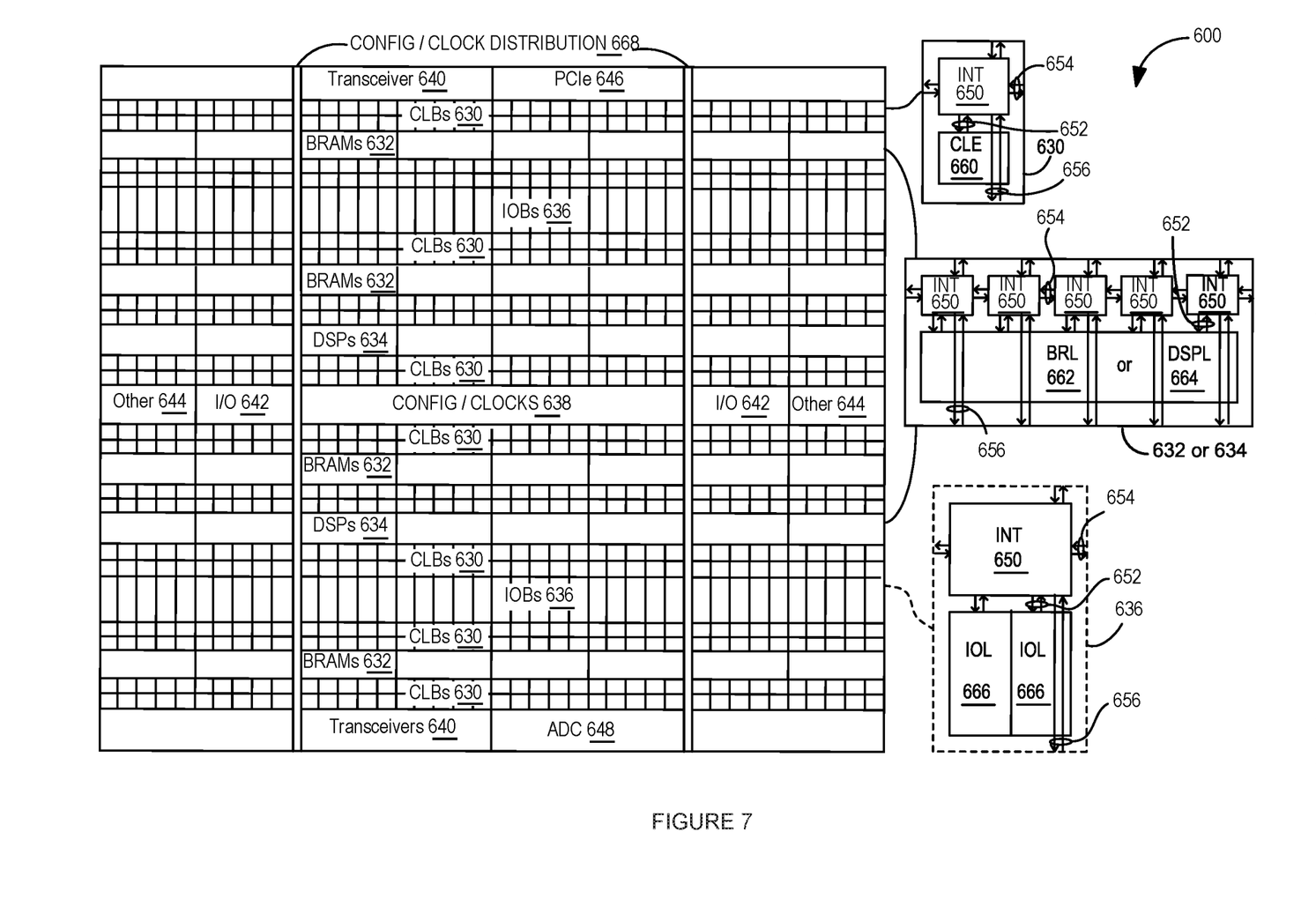
FIG. 7 shows a field programmable gate array (FPGA) implementation of the programmable IC, according to some examples.

FIG. 7 illustrates an FPGA implementation of the programmable IC 600 that includes a large number of different programmable tiles including configurable logic blocks ("CLBs") 630, random access memory blocks ("BRAMs") 632, signal processing blocks ("DSPs") 634, input/output blocks ("IOBs") 636, configuration and clocking logic ("CONFIG/CLOCKS") 638, digital transceivers 640, specialized input/output blocks ("I/O") 642 (e.g., configuration ports and clock ports), and other programmable logic 644 such as digital clock managers, system monitoring logic, and so forth. The FPGA can also include PCIe interfaces 646, analog-to-digital converters (ADC) 648, and the like.

In some FPGAs, each programmable tile can include at least one programmable interconnect element ("INT") 650 having connections to input and output terminals 652 of a programmable logic element within the same tile, as shown by examples included in FIG. 6. Each programmable interconnect element 650 can also include connections to interconnect segments 654 of adjacent programmable interconnect element(s) in the same tile or other tile(s). Each programmable interconnect element 650 can also include connections to interconnect segments 656 of general routing resources between logic blocks (not shown). The general routing resources can include routing channels between logic blocks (not shown) comprising tracks of interconnect segments (e.g., interconnect segments 656) and switch blocks (not shown) for connecting interconnect segments. The interconnect segments of the general routing resources (e.g., interconnect segments 656) can span one or more logic blocks. The programmable interconnect elements 650 taken together with the general routing resources implement a programmable interconnect structure ("programmable interconnect") for the illustrated FPGA.

In an example implementation, a CLB 630 can include a configurable logic element ("CLE") 660 that can be programmed to implement user logic plus a single programmable interconnect element ("INT") 650. A BRAM 632 can include a BRAM logic element ("BRL") 662 in addition to one or more programmable interconnect elements. Typically, the number of interconnect elements included in a tile depends on the height of the tile. In the pictured example, a BRAM tile has the same height as five CLBs, but other numbers (e.g., four) can also be used. A signal processing block 634 can include a DSP logic element ("DSPL") 664 in addition to an appropriate number of programmable interconnect elements. An IOB 636 can include, for example, two instances of an input/output logic element ("IOL") 666 in addition to one instance of the programmable interconnect element 650. As will be clear to those of skill in the art, the actual I/O pads connected, for example, to the input/output logic element 666 typically are not confined to the area of the input/output logic element 666.

In the pictured example, a horizontal area near the center of the die is used for configuration, clock, and other control logic. Vertical columns 668 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included in at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A computer-implemented method comprising:
   compiling a Register Transfer Level (RTL) code to form a data flow graph (DFG);
   identifying a chain of multiplexers in the DFG, wherein the chain of multiplexers includes exit multiplexers associated with a loop exit path and non-exit multiplexers;
   traversing a topological order of the DFG in reverse;
   computing fanin-cones for each two consecutive exit multiplexers;
   responsive to valid fan in-cones, back propagating select conditions for the each two consecutive exit multiplexers to generate a truth table; and
   eliminating an exit multiplexer from the each two consecutive exit multiplexers based on the truth table.

2. The method of claim 1, wherein at least one non-exit multiplexer is positioned in between each two consecutive exit multiplexers.

3. The method of claim 1, wherein an exit multiplexer is configured to receive all its input signals from outputs of other multiplexers in the DFG.

4. The method of claim 1, wherein an exit multiplexer is configured to receive at least one input signal from a multiplexer other than its immediately preceding multiplexer in the DFG.

5. The method of claim 1, wherein a non-exit multiplexer is configured to receive an input signal from a source other than an output of a multiplexer within the chain of multiplexers in the DFG.

6. The method of claim 5, wherein the non-exit multiplexer is configured to receive another input signal from an output of another multiplexer within the chain of the multiplexers in the DFG.

7. The method of claim 1, wherein a fanin-cone of an exit multiplexer is valid when input signals for the exit multiplexer is an output from preceding multiplexer within the chain in the DFG.

8. The method of claim 1 further comprising:
   responsive to an invalid fan in-cone for an exit multiplexer of the each two consecutive multiplexers, repeating the traversing and the computing for a remainder of the chain of multiplexers in the DFG.

9. The method of claim 1, wherein the each two consecutive exit multiplexers comprises a first exit multiplexer and a second exit multiplexer wherein the second exit multiplexer receives at least one input signal from the first exit multiplexer of the DFG.

10. The method of claim 9, wherein select signals of the first and the second exit multiplexers are back propagated through the fan in-cone of the second exit multiplexer.

11. The method of claim 9, wherein select signals of the first and the second exit multiplexers are back propagated through the fan in-cone of the first exit multiplexer.

12. The method of claim 9, wherein select signals of the first and the second exit multiplexers are back propagated through the first exit multiplexer.

13. The method of claim 9, wherein the eliminated exit multiplexer is the second exit multiplexer.

14. The method of claim 1 further comprising transforming the DFG to a new DFG after the elimination.

15. The method of claim 14, wherein a data flow of the new DFG is in opposite direction to that of the DFG.

16. The method of claim 15, wherein the chain of multiplexers includes a first non-exit multiplexer, at least one exit multiplexer, and a second non-exit multiplexer positioned in the topological order in the DFG, and wherein a data flow ordering of the first and the second non-exit multiplexers is reversed in the new DFG and the second non-exit multiplexer, the first non-exit multiplexer, and the at least one exit multiplexer are positioned in the topological order in the new DFG.

17. A computer-implemented method comprising:
   receiving a data flow graph (DFG) generated from compilation of a Register Transfer Level (RTL) code;
   identifying a chain of multiplexers in the DFG, wherein the chain of multiplexers includes exit multiplexers associated with a loop exit path and non-exit multiplexers;
   traversing a topological order of the DFG in reverse;

computing fanin-cones for each two consecutive exit multiplexers;

responsive to valid fan in-cones, back propagating select conditions for the each two consecutive exit multiplexers to generate a truth table; and transforming the DFG to a new DFG based on the truth table, wherein a data flow of the new DFG that include the chain of multiplexers is in reverse order in comparison to the DFG and wherein the chain of exit multiplexers are eliminated in the new DFG.

18. The method of claim 17, wherein an exit multiplexer is configured to receive all its input signals from outputs of other multiplexers in the DFG, and wherein a non-exit multiplexer is configured to receive an input signal from a source other than an output of a multiplexer within the chain of multiplexers in the DFG.

19. The method of claim 17, further comprising: responsive to an invalid fan in-cone for an exit multiplexer of the each two consecutive exit multiplexers, repeating the traversing and the computing for a remainder of the chain of multiplexers in the DFG.

20. The method of claim 17, the chain of multiplexers includes a first non-exit multiplexer, at least one exit multiplexer, and a second non-exit multiplexer positioned in the topological order in the DFG, and wherein a data flow ordering of the first and the second non-exit multiplexers is reversed in the new DFG and the second non-exit multiplexer, the first non-exit multiplexer, and the at least one exit multiplexer are positioned in the topological order in the new DFG.

* * * * *